United States Patent [19]

Schexnayder, Jr. et al.

[11] 3,871,162

[45] Mar. 18, 1975

[54] SUGAR CANE HARVESTER

[75] Inventors: Isby L. Schexnayder, Jr., Jeanerette; John W. Angers, New Iberia, both of La.

[73] Assignee: J & L Engineering Company, Inc., Jeanerette, La.

[22] Filed: June 18, 1973

[21] Appl. No.: 370,644

[52] U.S. Cl. .................................. 56/14.3, 56/60
[51] Int. Cl. ............................................ A01d 45/02
[58] Field of Search ............ 56/13.9, 13.8, 14.3, 60, 56/61, 503, 82, 88, 93, 98, 106, 108, 111, 119

[56] References Cited
UNITED STATES PATENTS

| | | | |
|---|---|---|---|
| 530,493 | 12/1894 | Newell | 56/82 |
| 1,039,327 | 9/1912 | Scott | 56/60 |
| 2,067,104 | 1/1937 | Spell | 171/24 |
| 2,348,634 | 5/1944 | McEachern | 56/13.9 |
| 2,648,942 | 8/1953 | Grant et al | 56/14.3 |
| 3,039,258 | 6/1962 | Cafaro | 56/49 |
| 3,095,680 | 7/1963 | Thornton | 56/13.7 |

Primary Examiner—Russell R. Kinsey
Attorney, Agent, or Firm—Clarence A. O'Brien; Harvey B. Jacobson

[57] ABSTRACT

Sugar cane stalks received within the gathering devices of a harvester are held erect by a holding conveyor from which they are rearwardly fed to the rotating blades of a ground cutter assembly and to a plurality of vertically spaced feeding conveyors within which the severed stalks are held as they are cut into sections by rotary sectioning blades. The feeding conveyors, sectioning blades and ground cutter assembly are mounted for simultaneous vertical adjustment relative to the vertically stationary holding conveyor.

6 Claims, 6 Drawing Figures

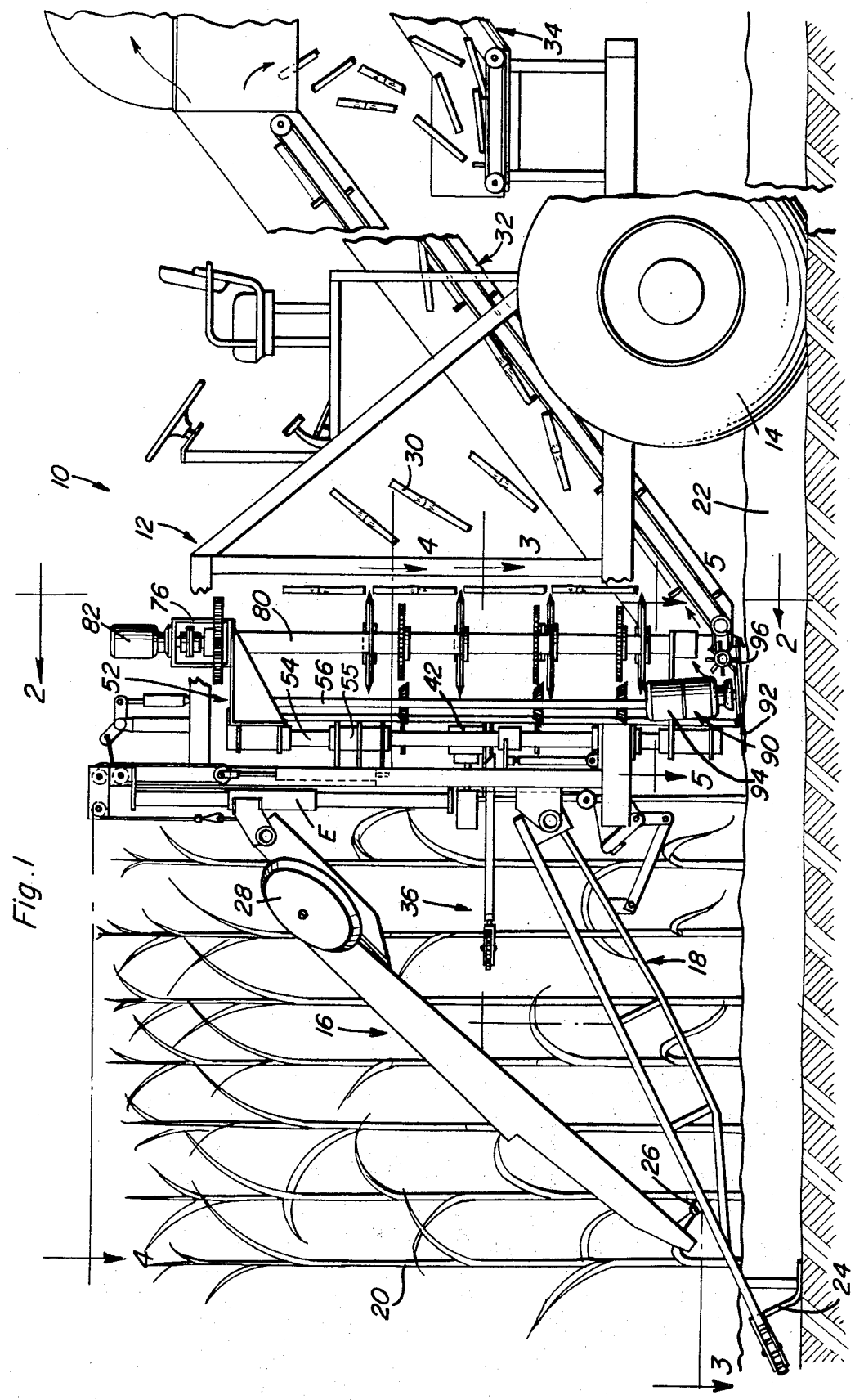

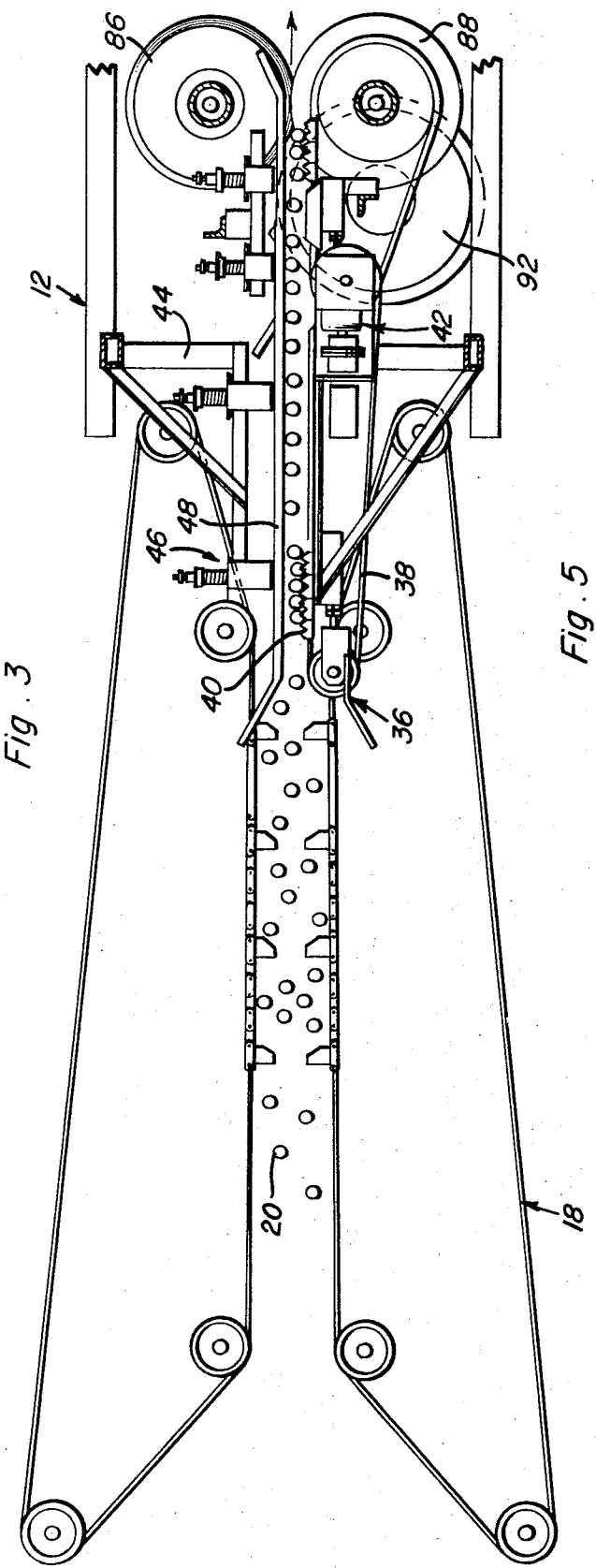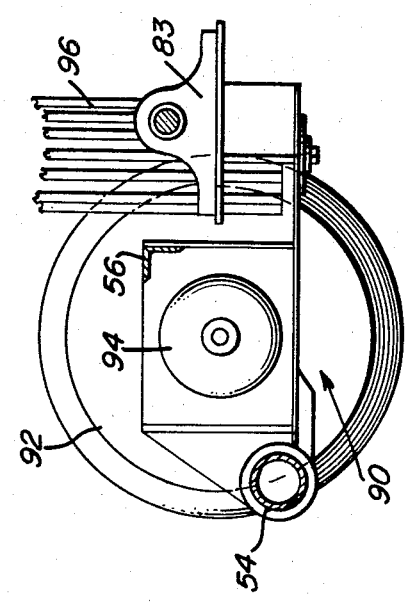

SUGAR CANE HARVESTER

This invention relates in general to agricultural machines and more particularly to machines for harvesting crops of the vertically elongated stalk type, such as sugar cane.

Generally, sugar cane harvesters are operative through forwardly mounted gathering devices to hold the sugar cane stalks erect while topping them, after which the stalks are rearwardly displaced into cutter assemblies for severing the stalks at the ground and cutting them into sections. The severed and sectioned stalks are deposited on an upwardly inclined elevator conveyor from which they are transferred by a loading conveyor to carts. Because of different crop varieties and growing conditions, various adjustments must be made to the harvesting machine. Also, because of the operational relationship of the various components of the harvester, adjustment of any one component often calls for corresponding adjustments of the other components. It is therefore, an important object of the present invention to simplify the adjusting procedure and reduce the amount of adjustment required with respect to sugar cane harvesters of the aforementioned type.

In accordance with the present invention, the main frame of a sugar cane harvesting machine provides for pivotally adjusted support of the gathering devices and vertically adjustable support for a sub-frame support assembly on which the ground cutter, stalk sectioning cutter and stalk feeding assemblies are mounted. Height adjustment of the foregoing assemblies may thereby be effected relative to a vertically stationary holding conveyor which engages the stalks and holds them erect as they are being topped. This holding conveyor is disposed in horizontal overlapping relationship to the vertically adjustable feeding conveyor assembly which includes a plurality of vertically spaced feeding devices that engage the stalks and rearwardly displace them while they are being cut at the ground and by the stalk sectioning assembly wherein the stalks are cut into vertical sections that drop onto the rearwardly inclined elevator conveyor aforementioned. A flipper roller also mounted by the vertically adjustable sub-frame support assembly, displaces severed stalk sections adjacent the ground cutter assembly onto the elevator conveyor. The vertical height adjustment aforementioned may be effected without disturbing the relationship between the ground cutter, flipper, stalk sectioner and stalk feeding devices.

These together with other objects and advantages which will become subsequently apparent reside in the details of construction and operation as more fully hereinafter described and claimed, reference being had to the accompanying drawings forming a part hereof, wherein like numerals refer to like parts through, and in which:

FIG. 1 is a somewhat simplified side elevational view of a sugar cane harvester constructed in accordance with the present invention.

FIG. 3 is a partial top sectional view taken substantially through a plane indicated by section line 3—3 in FIG. 1 with parts omitted for sake of clarity.

FIG. 5 is an enlarged partial sectional view taken substantially through a plane indicated by section line 5—5 in FIG. 1.

Figure 6:
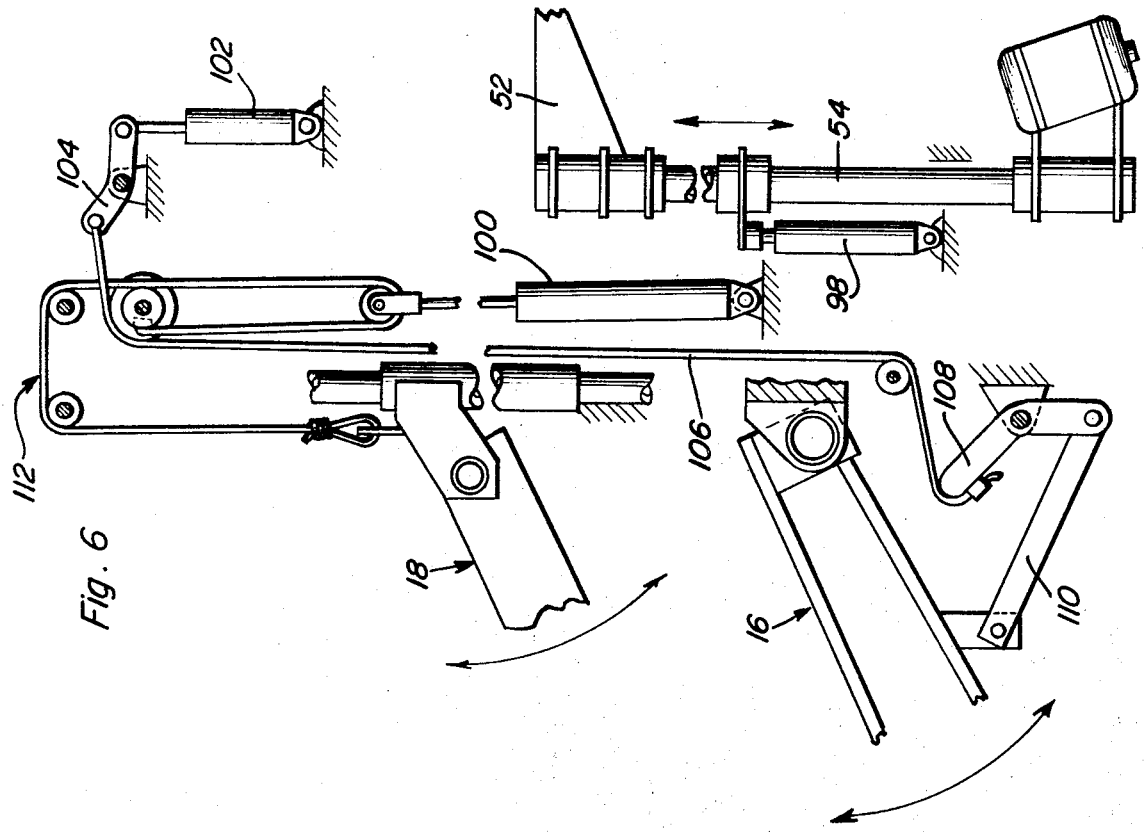
FIG. 6 is a simplified partial side elevational view of a portion of the harvester showing the adjustment facilities.

Referring now to the drawings in detail, FIG. 1 illustrates a sugar cane harvesting machine generally referred to by reference numeral 10 which includes a main frame assembly generally referred to by reference numeral 12 supported by a pair of traction wheels 14. The main frame assembly constitutes the mobile chassis of a propelled vehicle usually associated with a harvesting combine. Pivotally mounted by the main frame assembly and extending forwardly therefrom are upper and lower gathering devices 16 and 18 between which the vertical sugar cane stalks 20 are received as the machine is propelled forwardly along rows of sugar cane with the traction wheels 14 riding in furrows 22, the bottoms of which are engaged by skids 24 supporting the lower end portions of the lower gathering devices 18. The gathering devices are illustrated somewhat schematically in the drawings for sake of clarity since they are of a well known type such as those disclosed in U.S. Pat. No. 3,095,680 to Thorton. The details of these gathering devices therefore form no part of this invention. The upper gathering devices 16 are supported at their lower ends on the frame of the lower gathering devices 18 by the pivot means 26 while topper blades 28 are mounted adjacent the upper ends thereof for topping the top portions of the sugar cane stalks. Rotary topping blades associated with gathering devices are also well known and hence are also not described in detail. After the stalks are topped, they are cut adjacent the ground are sectioned into vertical sections 30. The sections of the stalks are deposited onto an upwardly inclined elevator conveyor 32 from which the stalk sections are transferred to a delivery conveyor 34 after passing through the cleaning action of a debris removing fan. The delivery conveyor 34 loads the cut stalks into carts as is well known in connection with sugar cane harvesters.

In the embodiment of the invention illustrated in FIG. 1, a vertically stationary holding conveyor generally referred to by reference numeral 36 engages the stalks and holds them erect as they are topped. This holding conveyor 36 therefore extends forwardly from the main frame assembly between the upper and lower gathering devices 16 and 18. As more clearly seen in FIG. 3, the holding conveyor 36 includes an endless drive belt 38 having a run that extends in close spaced parallel relationship to the longitudinal axis of the harvester so as to engage stalks by means of stalk engaging elements 40 mounted on and projecting from the endless belt 38. A power motor driven drive assembly 42 is mounted on a support connected to the main frame 12 by the cross frame members 44 to which a bar is connected for supporting a plurality of longitudinally spaced spring biased supports 46 for a rail 48 along which the stalks are rearwardly displaced by the stalk engaging elements 40 on the conveyor belt 38. The stalks are thereby rearwardly displaced by the holding conveyor 36 into engagement with a plurality of feeding conveyor devices 50 that are vertically spaced from and disposed in longitudinally overlapping relationship to the holding conveyor 36 as more clearly seen in FIG. 3.

Figure 4:
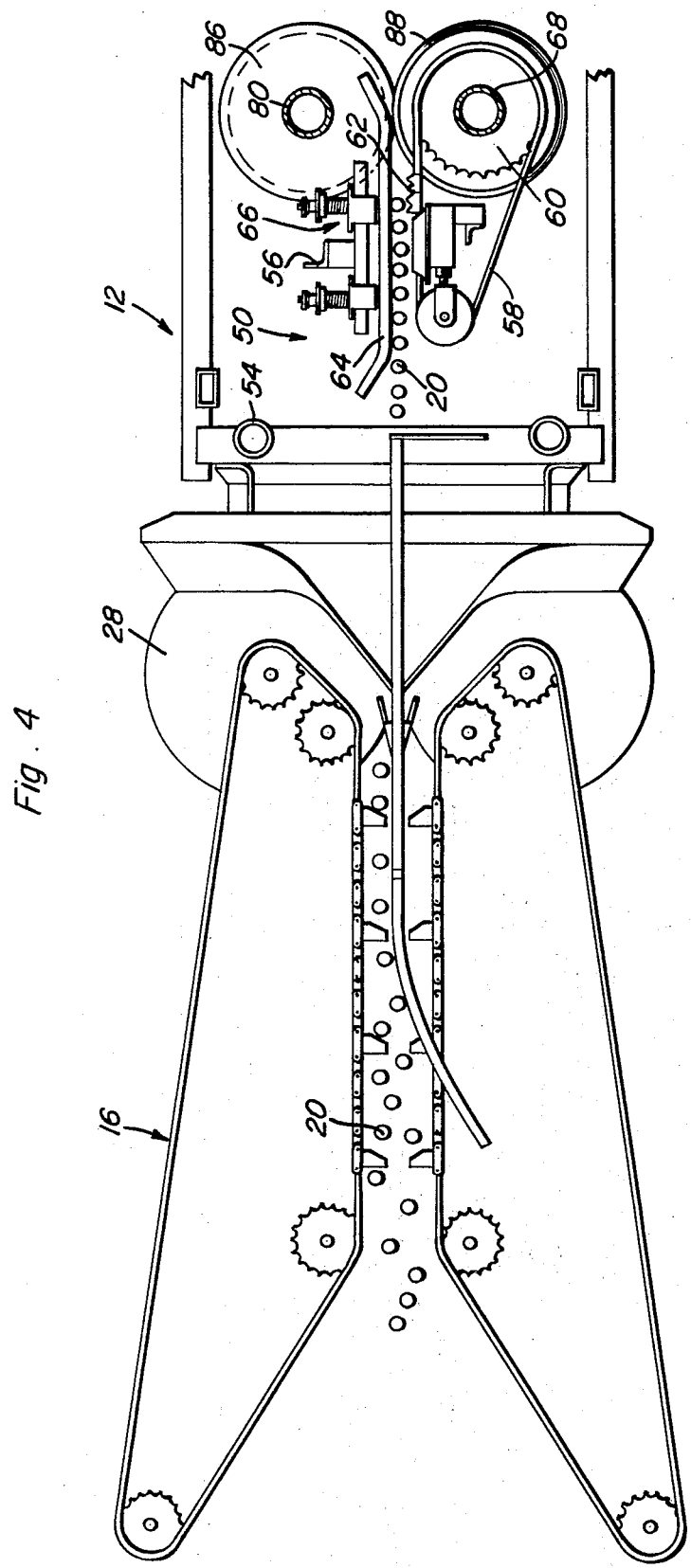
FIG. 4 is a partial top sectional view taken substantially through a plane indicated by section line 4—4 in FIG. 1 with parts omitted for sake of clarity.

The feeding conveyor devices 50 are fixed in vertically spaced relationship to each other but are all simultaneously adjustable in a vertical direction by means of a sub-frame support assembly generally referred to by reference numeral 52 which includes a pair of laterally spaced guide tube frame members 54 slidably mounted by a sleeve 55 fixed to the main frame assembly 12 as shown in FIG. 1. Laterally spaced, right angled frame posts 56 form part of the sub-frame support assembly 52 and mount at the vertically spaced locations, each of the feed conveyor devices 50 aforementioned. As more clearly seen in FIGS. 2 and 4, each of the feed conveyor devices 50 includes an endless conveyor chain 58 driven by a sprocket wheel 60 and mounting thereon a stalk engaging element 62. The longitudinal run of the conveyor chain 58 spaced in parallel adjacency to the longitudinal axis of the harvester will thereby rearwardly displace the stalks along a rail 64 mounted by a pair of spring biased rail suspports 66 secured to one of the post frame members 56.

Figure 2:
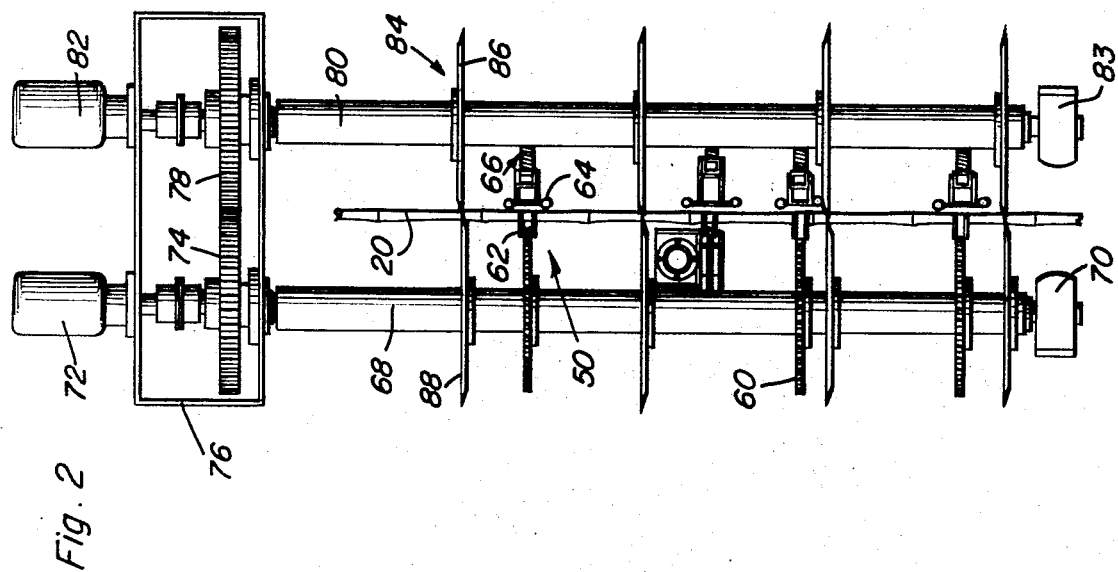
FIG. 2 is a transverse sectional view taken substantially through a plane indicated by section line 2—2 in FIG. 1.

As more clearly seen in FIG. 2, each of the sprocket wheels 60 associated with the feeding conveyor devices 50, is secured to a vertical drive shaft 68. The drive shaft 68 is rotatably mounted by a bearing assembly 70 at the lower end and is connected at its upper end to a hydraulic motor 72. A synchronizing gear 74 is secured to the drive shaft 68 within a gear casing 76 through which the drive shaft 68 extends to the hydraulic motor 72 mounted on top of the casing. The gear 74 meshes with another gear 78 connected to the upper portion of a drive shaft 80 which also extends through the gear casing 76 and is connected to a second hydraulic motor 82. The drive shaft 80 which is disposed in parallel spaced relationship to the drive shaft 68 is also rotatably supported adjacent its lower end by a bearing assembly 83. The stalk sectioning assembly generally referred to by reference numeral 84 is mounted by the drive shafts 68 and 80. The sectioning assembly thus includes a plurality of rotary blades 86 disposed in radially overlapping relationship to cooperating blades 88 on the drive shaft 68. Each pair of blades 86 and 88 is mounted on the respective drive shafts 80 and 68 in vertically spaced relationship between the feeding conveyor devices 50 so that the stalks 20 will be diplaced and held by the feeding devices as they are cut by the blades 86 and 88. Since the feeding devices 50 and the sectioning assembly 84 are mounted on a common sub-frame assembly, they may be simultaneously adjusted without disturbing the relationship therebetween. Furthermore, a common drive assembly is provided for the blades 88 and each of the feed conveyor devices 50 through the drive shaft 68.

The vertically adjustable sub-frame assembly 52 also mounts a ground cutter assembly generally referred to by reference numeral 90 as more clearly seen in FIGS. 1 and 5. The ground cutter assembly includes a rotary cutter blade 92 which is driven by a motor 94 supported by the sub-frame assembly 52 so that the cutter blade 92 will be inclined at an acute angle to the ground as shown in FIG. 1. The cutter blade 92 extends laterally across the longitudinal axis of the harvester so as to cut the stalks at the ground level just forwardly of the chopper blades 86 and 88 as more clearly seen in FIG. 3. The stalks are accordingly severed at ground level and sectioned in sequence as they are conveyed rearwardly and held vertically by the feeding conveyor devices 50.

Also mounted on the sub-frame assembly 52 below the chopper assembly and just rearwardly of the ground cutter assembly 90 is a flipper wheel 96 as shown in FIGS. 1 and 5. The flipper wheel is rotatable in a clockwise direction as viewed in FIG. 1 so that it will displace severed stalks onto the upwardly inclined elevator conveyor 32.

As more clearly seen in FIG. 6, the sub-frame assembly 52 is vertically adjustable through a hydraulic adjustment cylinder device 98 connected to the tubular frame member 54. The adjustment cylinder device 98 is, therefore, anchored to the main frame assembly. Also anchored to the main frame assembly are adjustment cylinder devices 100 and 102 through which the upper and lower gathering devices are pivotally adjusted. Accordingly, the cylinder device 102 is operatively connected through the lever 104, cable 106, lever 108 and link 110 to the frame of the lower gathering device 16 while the adjustment cylinder device 100 is connected through the cable and pulley assembly 112 to the frame of the upper gathering device 18. Hydraulic controls (not shown) well known to persons skilled in the art will be connected to the foregoing cylinder devices 98, 100 and 102 in order to effect the desired adjustments.

The foregoing is considered as illustrative only of the principles of the invention. Further, since numerous modifications and changes will readily occur to those skilled in the art, it is not desired to limit the invention to exact construction and operation shown and described, and accordingly all suitable modifications and equivalents may be resorted to, falling within the scope of the invention.

What is claimed as new is as follows:

1. In a harvesting machine having a mobile frame adapted to be propelled in a forward direction along rows of crop stalks in the ground, means mounted on the frame in substantially fixed spaced relation to the ground for holding the stalks erect, cutter means for cutting the stalks adjacent the ground while held erect, means mounted in overlapping relation to the stalk holding means for rearwardly displacing the stalks severed by the cutter means, sectioning means for cutting the severed stalks into vertical sections as they are rearwardly displaced, support means on the frame operatively mounting the cutter means, the rearward displacing means and the sectioning means for simultaneous vertical adjustment relative to the stalk holding means, and flipper means rotatably mounted by said support means below the sectioning means for rewardly displacing severed stalk sections above the cutter means.

2. The combination of claim 1 wherein each of said feeding devices includes a conveyor chain, stalk engaging elements mounted on the conveyor chain, and a spring biased rail mounted on the frame along which the stalks are displaced by the engaging elements.

3. In a harvesting machine having a mobile frame adapted to be propelled in a forward direction along rows of crop stalks in the ground, means mounted on the frame in substantially fixed spaced relation to the ground for holding the stalks erect, cutter means for cutting the stalks adjacent the ground while held erect, means mounted in overlapping relation to the stalk holding means for rearwardly displacing the stalks severed by the cutter means, sectioning means for cutting the severed stalks into vertical sections as they are rearwardly displaced, and support means on the frame operatively mounting the cutter means, the rearward displacing means and the sectioning means for simultaneous vertical adjustment relative to the stalk holding means, said rearward displacing means comprising a plurality of vertically spaced stalk feeding devices simultaneously engageable with the severed stalks at vertically spaced locations and a common drive assembly for said feeding devices.

4. The combination of claim 3 wherein each of said feeding devices includes a conveyor chain, stalk engaging elements mounted on the conveyor chain, and a spring biased rail mounted on the frame along which the stalks are displaced by the engaging elements.

5. The combination of claim 3 wherein said sectioning means includes a vertical drive shaft, a plurality of rotary blades mounted on the drive shaft vertically between the stalk feeding devices, and a plurality of cooperating blades mounted on the common drive assembly for the stalk feeding devices.

6. The combination of claim 5 wherein said cutter means includes a pair of radially overlapping cutter blades included downwardly in said forward direction at an acute angle to the ground, and power means drivingly connected to said cutter blades for rotation thereof independently of the chopper means.

* * * * *